Oct. 15, 1935.  E. P. KNOX  2,017,503
CONSTRUCTION PROJECTOR
Filed Nov. 2, 1933  2 Sheets-Sheet 1
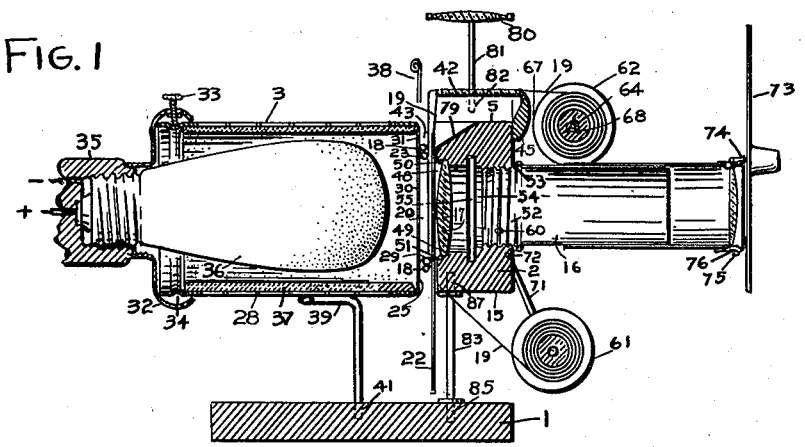
INVENTOR.
EDWARD P. KNOX.
BY
PAUL A. TALBOT.
ATTORNEYS.

Oct. 15, 1935.  E. P. KNOX  2,017,503
CONSTRUCTION PROJECTOR
Filed Nov. 2, 1933  2 Sheets-Sheet 2
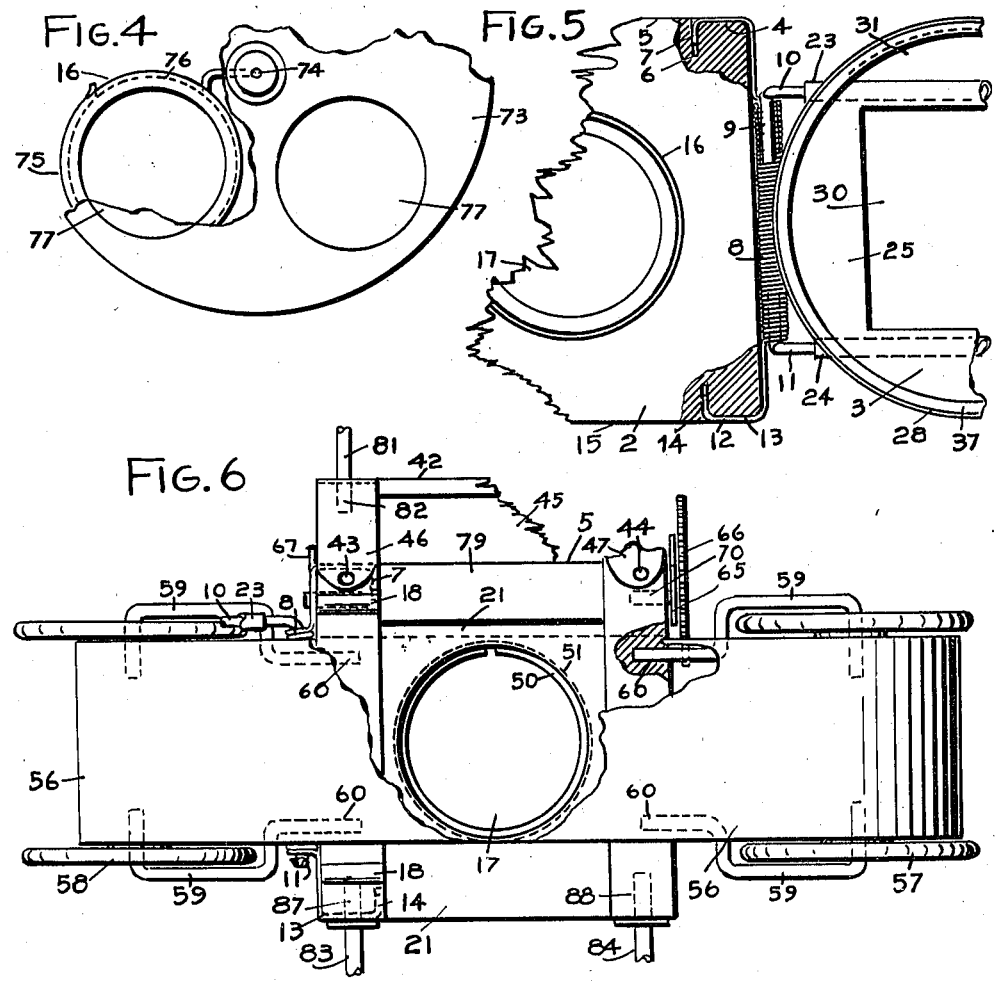
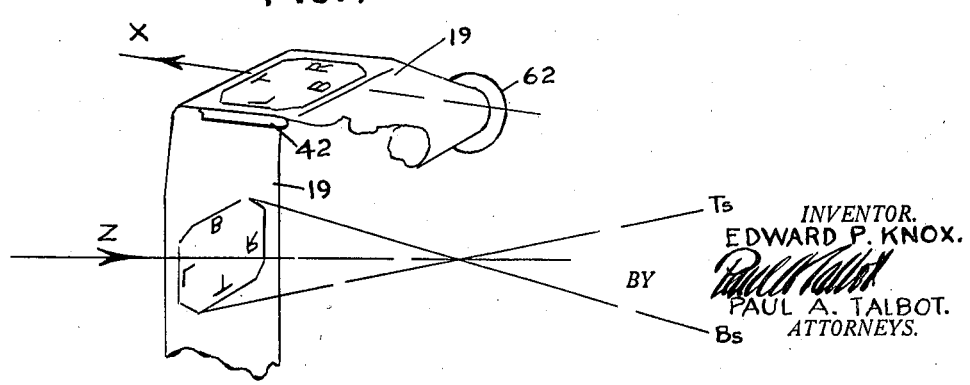
INVENTOR.
EDWARD P. KNOX.
BY PAUL A. TALBOT.
ATTORNEYS.

Patented Oct. 15, 1935

2,017,503

UNITED STATES PATENT OFFICE 2,017,503

CONSTRUCTION PROJECTOR

Edward P. Knox, Toms River, N. J.

Application November 2, 1933, Serial No. 696,403

4 Claims. (Cl. 88—24)

This invention relates to a projector of pictures, writing and design, of a non-photographic character, and is particularly adapted to the projection of images on a transparent cellulose medium such as cellophane, or other allied products on which is written, printed or drawn, independent of photographic processes, directly upon the film of such material for the purpose of still or motion picture projection. I have thus provided a simple and effective means for affording opportunity to originate and construct original and interesting combinations of designs and colors, to be projected through the varied application of slides and projection wheels especially devised for receiving the image which may be written, painted or drawn upon a blank strip of "film" of this character and thus project the result immediately upon a screen. As a medium for the projection of still pictures, the invention, from the point of interest, is an improvement on the old style of magic lantern because interest may be awakened and sustained through the variety of ways in which projection may be accomplished; as when a slide is inserted in the same plane of focus as a strip of film running down from a reel above, two points of interest being created; or, as when a strip having a lateral movement crosses a strip having a perpendicular movement against an inserted slide, made possible by the thinness and extreme transparency of the material employed, thus creating three points of interest; a fourth point of interest may now be introduced by the application of a color member inserted in a rotating wheel; and a fifth point of interest added by the use of a dissolving focus through one of the parts of my invention.

Under such combinations, design, writing, printed matter may be introduced at the will of the manipulator, so that his interest is sustained, and thus one is at liberty to use his creative ability in the projection of his own projection matter.

Projection as referred to above is made possible by present day developments in the art of printing upon cellophane, and in the ability of the manufacturer to furnish materials, such as transparent paints and inks, that can be used in projection and made available to the public in so far as it evinces interest in the graphic arts.

Projection of a non-photographic origin is now little used; thus I have facilitated artistic, constructive, or creative ability, which, given opportunity to develop in the field of projection, is freed from any of the restrictions imposed by reliance upon photography. This form of projection, being new and different from photographic projection, I prefer to term as celugraphic, having to do with the graphic arts as distinct from photographic arts as applied directly to the surface of a film. This invention is related to the projection of pictures in motion only in so far as the simple basic principles of imparting motion may be applied to pictures that have been directly drawn or printed on a strip of transparent cellulose nature; in short, to motion through projection of a celugraphic character. Provision for a shutter and a film moving device is therefore included in the invention.

One of the objects of the invention is to provide a projector that may be built up, or assembled from basic units so devised that the component parts of the projector may be fitted together without resort to the use of tools, and the projector easily erected from parts separately prepared in manufacture by simple processes through the use of set machines and the use of suitable stamping and cutting dies. In this way, the assembly of the units, or component parts of the projector, may be left to the final recipient, and offered to him in such a way that his interest will be aroused in the manner of the assembly of separate parts, finding entertainment in their assembly.

Another important object of this invention is to provide a cellographic construction projector that when assembled together from the main units of a base or head, supports, lighting chamber, housing, lens and slideway, may have added to it other units in the form of devices and accessories, that will increase the points of interest in, and the usefulness of the main units already assembled into a whole: these attachable devices being in the form of holders for slides, brackets and axles for reels, a transparent table on which the surface of a transparent cellulose strip medium may be drawn upon, or written upon, for immediate and properly positioned projection; supports for rotating apertured wheels, a winding mechanism to give rapid rotation and support to a reel; these attachable and supplementary accessories to the above mentioned devices being in the form of spool reels, apertured slides adapted to the reception of a transparent cellulose member, apertured wheels adapted to the reception of a similarly transparent member or to any opaque member instrumental in converting the wheel into a form of motion shutter, a magnifying device accessory to the writing table, other small accessories hereafter described accessory to the writing device unit, and for the control and reflection of light.

All of these units are only attachable to the main and basic units of this invention, each in its proper place and position: each of these accessory units having its receptivity and proper position in the unit for which it is intended; these units and accessory units being added to the main units of a built up projector in varying degrees of interest and application.

Another important object of this invention is to afford, through the basic units comprising the lighting chamber, a convenient and accessible source for light through the adaptability of the unit for attachment to certain standardized electric lighting fixtures universally obtainable, such as brackets used for the holding of globes and lampshades through a triad arrangement of cap screws and made to be screwed upon ordinary electric sockets having switches, the source of the light in this manner coming from certain universally used incandescent lamps the use of which makes it possible to dispense with a condensing lens as an integral part of the projector lighting apparatus, such as the use of lamps having frosted bulbs. And, to provide a lighting chamber that will confine the light as a means for projection, which will, at the same time modify and disseminate the heat generated by the source of light in such a way that it will not intensely permeate the units of the projector adjacent to the lens and other nearby parts.

Another object of this invention is to provide a means of holding the lenses of the projector that will simplify that portion of a projector usually referred to as the housing chamber, making of it a compact and separate head unit, receptive to attachable accessories, as hereinafter described.

I accomplish these and other objects by the construction shown in the accompanying drawings, in which:

Figure 1 is a longitudinal section showing many of the parts assembled.

Figure 2 is a side elevation of my device showing many of the parts assembled.

Figure 3 is a fragmentary plan view showing the head unit and some of the attachments secured thereto.

Figure 4 is a view of the front color wheel adapter.

Figure 5 is a fragmentary view of the head unit and light chamber.

Figure 6 is a view of the head and horizontal film and other attachments with the light chamber removed.

Figure 7 is a diagrammatic view showing the relationship of the drawing and projecting positions of the image.

By "in front" I mean toward the lens and projecting screen, and by "behind" I mean toward the light in relation to the rear lens.

Similar reference characters refer to similar parts throughout the several views of the accompanying drawings.

My projector comprises a base 1, and head unit 2, to which many of the parts are detachably secured, and upon which many of the attachments may be easily assembled.

By referring to Figure 5, it may be seen that the light chamber 3 is of particular interest because of its construction and functions, as well as the manner of its attachment to the head 2, which is provided with the groove 4 in the upper surface 5 thereof, and the aperture 6, which, with said groove 4, receives the end 7, of the coil 8, of a spring preferably closely wound to form a bearing 9, which receives the upper hinge member 10. The lower hinge member 11 is likewise provided with a bearing, and the opposite end 12, of the coil 8, is formed to engage the groove 13 and aperture 14 in the bottom surface 15.

The upper and lower hinge members 10 and 11 are so formed as to permit the light chamber 3 to swing 270 degrees from its normal position in axial alignment with the tubular lens housing 16, thus giving free and unobstructed access to the rear lens 17, latches 18, film 19, rear horizontal slideway 20 and vertical slideway 21, through which said film 19 passes, as well as other parts and attachments, such as the color wheel 22.

The light chamber 3 is provided with the tubular members 23 and 24, secured in horizontal parallel relation to the apertured end 25 thereof, and preferably formed by rolling the sheet metal of which said tubular members are thus formed, thereby providing the necessary resilience to snugly grip but yieldingly permit the upper and lower hinge members 10 and 11 to slide horizontally therein for their removal, and to permit centering said light chamber 3 with the lens 17. In like manner, the members 26 and 27 of the bearing 29 of said color wheel 22 may be inserted in said tubular members 23 and 24, as well as centered. Other attachments may thus be readily attached without the use of tools, to my device, permitting a great variety of artistic effects to be produced, and permitting a greater interest in my projector by reason of building it up out of the simple parts and attachments, only a few of which are shown and herein described.

The end 25, of said light chamber 3, is provided with the opening 30, through which the light passes to and through the films, slides and lenses onto the screen onto which the objects and figures are projected. In addition to said opening 30, I have provided an opening 31, through which a part of the light passes to facilitate painting, sketching and in other ways producing the image on said film; the artistic creativeness of which this device makes possible, and which has elsewhere herein been set forth.

The light chamber 3 is provided with an openly perforated housing or framework 28, secured to or formed integral with said end 25, and preferably detachably secured to the cover 32, which may be provided with the thumb screws 33, engaging the annular groove 34. Said cover 32 is provided with the light socket 35, detachably secured thereto to supply electric current for, and supporting the electric light 36, in the usual manner. Within the housing 28, I have provided a heat resisting, porous, opaque lining 37, permitting the flow of air but not light through it. This lining may be of pressed or moulded asbestos fiber such as asbestos paper, or any other similar heat resisting felt like or woven material. Thus the heat from the electric light may be carried only to a slight degree to the many parts near it, including the film and slides. By experiment, a film of cellophane has not been affected when held in fixed relation in the rear slideway of my device for many hours.

The electric light 36, is a frosted bulb, and because of the distribution of light from it a condenser lens is not needed or desirable.

The opening 31, when not in use, is shut by the light shield 38, which slides in behind the upper tubular member 23. The weight of the light chamber and the parts which it supports may be carried in part by the bridge 39, on which it rests when in its normal position. Said bridge is preferably detachably secured to the base 1 by engaging the apertures 40 and 41 therein.

The head unit 2 may be an integral casting, or may be constructed of a number of parts secured together or assembled. A removable editing or drawing table 42, of translucent material, preferably ground glass, is held rigidly in place above said head unit by the pins 43 and 44, as well as the front strip 45, which is drawn against the front face of said head unit 2, due to the springiness of the apertured straps 46 and 47, engaging said pins 43 and 44, and pressing against the rear face of said head 2, which also is provided with the latches 18, hereinbefore mentioned, which secure the light chamber 3 thereagainst. The rear face of said head is also recessed or bored 48, to receive said lens 17, which is held in place against the shoulder 49 by the annular spring 50, engaging the annular groove 51.

The lens housing 16, is secured to the head 2, by the threads 52, and shoulder 53, engaging the threaded recess or bore 54, communicating and in axial alignment with said recess or bore 48. A front slideway 55, between the lens 17 and lens housing 16, communicates with and passes horizontally across said recess or bore 54, permitting either the horizontal film 56, to pass therethrough or a lantern slide to be projected simultaneously with said film, which may be also fed through said horizontal slideway 20.

The film 56, is wound on and off of the spools or reels 57 and 58, which revolve on the brackets 59, engaging the apertures 60 of the head 2.

The vertical film 19, is wound on the lower spool 61 and upper spool 62, which is turned at increased speed if desired, by the pinion 63, which is secured to the shaft 64, journalled in the bracket 65, which also rotatably supports the gear wheel 66, which meshes with said pinion 63. The bracket 67, also forms a bearing for the end of said shaft 64, which drives said upper spool 62 by the lugs 68, forming grooves when forced into the bore of said spool when made of soft wood. The brackets 65 and 67 engage the apertures 69 and 70 in the head unit 2.

The lower spool 61, is rotatably mounted on the brackets 71, engaging the apertures 60 and 72 in each side of the head unit 2.

I have also shown a front color wheel 73, rotatably mounted on the pin 74, formed integral or secured to the adapter 75, which yieldingly engages the annular groove 76 in the end of the lens housing 16, thus the transparent colors which are provided in the plurality of openings 77, in said color wheel being out of focus give a pleasing array of softened light effects by revolving.

The wheel 73, may also be modified to synchronize with the movement of the film 19, to act as a shutter, facilitating experiments in animated sketches which may be drawn on the table 42, which is ruled with the lines 78, to assist in centering and sizing such sketches on said film 19, which passes thereover.

The table 42 is also well lighted through its translucent surface by the reflector 79, as well as the direct rays from the electric light 36, which pass through the opening 81, in the end of the light chamber 3, for this purpose.

I have also provided a magnifying lens 80, to assist the artist using the table 42, said lens is preferably detachably and swingingly mounted on the post 81, engaging the aperture 82, in said table.

The head 2, is secured to the base 1, by the posts 83 and 84, which engage the apertures 85 and 86 in said base 1, and the apertures 87 and 88, in the head unit 2.

It may be seen from the above that the relation of the vertical film and the reels or spools on which it is wound and the table and light enable the operator to draw on the table, and that the film as it passes thereon will have the image inverted and changed from left to right in passing back of the lens, thus, when projected, the image is shown on the screen in its proper position, thus doing away with guides and the difficulties encountered in inverting the film for projection, and yet permitting it to be drawn upon in its same position as when it is projected.

The use of the frosted electric light 36, of the proper size, makes the use of condensing lenses unnecessary, therefore the films, slides, etc., are all directly in front of the rear lens, or behind and between it and the light.

By referring to diagrammatic view, Figure 7 of the accompanying drawings, the relationship of the image when upon the table 42 and when in the line of projection may be readily seen. When viewing the image in the direction shown by the arrow and line x, it will be seen that the top of the image T as well as the bottom B and the sides L designating the left side, and R designating the right side are in their proper relation as regards the image on said table 42 at the time the image is drawn on said film 19, and that said initials represent abbreviations of their respective positions on said image.

When the image is moved to the projection position as viewed by the arrow, and line of projection Z as viewed from the direction of said arrow, all of said initials T, B, L and R are reversed from their position on the table 42 to exactly the opposite position and after passing through the lens are again in the proper relationship on a screen as at Ts and Bs; thus the image is projected as drawn on said table 42.

I do not wish to be limited to the exact construction herein described and shown in the accompanying drawings, as I may wish to depart therefrom within the scope of the appended claims which succinctly set forth what I claim as my invention.

I claim:—

1. In a projector, a head, a light chamber cut away to form an open framework and a light therein, both swingingly mounted in relation to said head, a slideway in said head exposed when said light chamber is swung away from said head and a porous heat resisting lining for said light chamber surrounding said light and combining with said open framework of said light chamber to reduce the conduction of heat from said light chamber to said slideway.

2. In a projector, a light chamber, a head, a slideway having a film travelling therein and a porous heat resisting non-conducting lining for said light chamber and an openly perforated housing forming an open framework of metal retaining said lining to reduce the conduction of heat to said head slideway and the film travelling therein.

3. In a projector, a housing, an apertured end to said light chamber and housing, a drawing table, a reflector thereunder, receiving part of the light from said light chamber, a projecting lens and a film passing over said drawing table between said light chamber and said projecting lens said film having an image drawn thereon when over said drawing table, said image being projectable when moved in position before said projecting lens and a plurality of openings in said apertured end of said housing one of which admits light from said light chambers to said drawing table, the other independently admitting light to said projecting lens whereby the image drawn on said drawing table may be projected.

4. In a projector, a base, a head unit detachably mounted to move on a vertical axis in relation thereto, a light chamber swingingly secured to said base to render the head unit accessible when said light chamber is swung out of alignment with said head unit, and a bridge arranged horizontally coacting with said light chamber and the vertical axis on which it is mounted to support part of the weight of said light chamber, detachably secured to said base, whereby a part of the weight of said light chamber is carried thereon; said bridge permitting said light chamber to slide thereon while being swung.

EDWARD P. KNOX.